3,230,009
HOLDER MEANS FOR RETRACTABLE SAFETY SEAT BELT MEANS

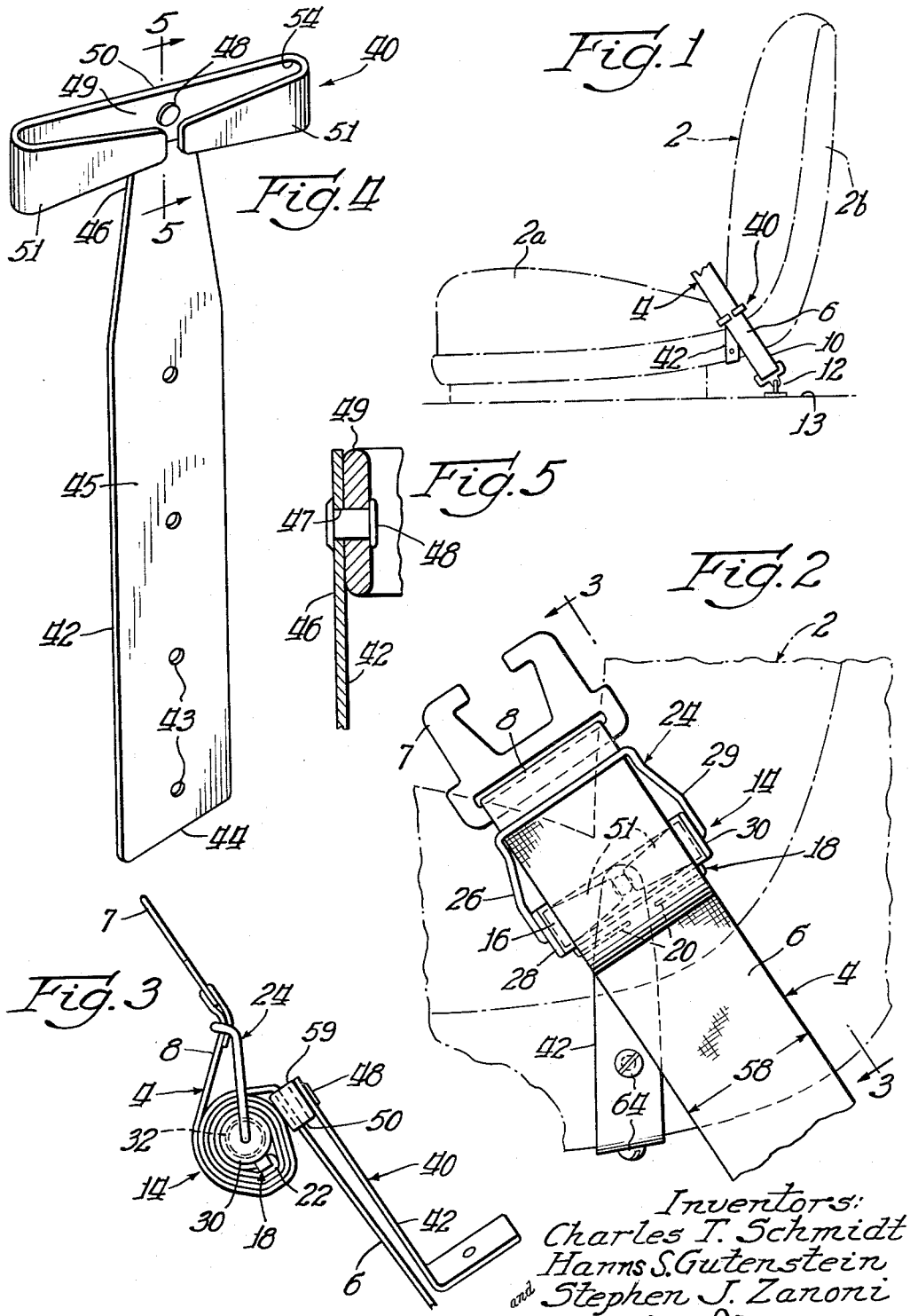

Charles T. Schmidt, Melrose Park, Hanns S. Gutenstein, Lombard, and Stephen J. Zanoni, Glen Ellyn, Ill., assignors to Borg-Warner Corporation, Chicago, Ill., a corporation of Illinois
Filed Jan. 2, 1964, Ser. No. 335,028
10 Claims. (Cl. 297—388)

This invention relates to a holder means for vehicle safety belts and in particular relates to a holder means for safety seat belt means of the retractable type wherein there is provided on the vehicle seat belt roll-up device that is anchored to the belt and permits the seat belt to be rolled up into coiled layers.

It is therefore a general object of this invention to provide a holder or support means for a retractable vehicle seat belt that allows the belt to be stored off the seat making vehicle entry easier and does not interfere with the operation of the seat.

Another object of this invention is to provide a seat belt holder means receiving a retractable seat belt and holding the same in a rolled up condition out of the way of the vehicle doorway and in a protective area so that it will not become damaged or soiled.

A further object of this invention is to provide a novel holder means for a retractable seat belt structure wherein the holder means may be pivotally adjusted for proper alignment of the retracted seat belt portion with the vehicle seat and within easy grasp of the seat belt operator.

Another object of this invention is to provide a holder device for a retractable safety seat belt which not only stores the belt in a convenient out-of-the-way place, readily accessible to the user, but also restricts further retraction of the belt into a rolled condition which would otherwise locate the belt in an inaccessible place or would allow the belt to become damaged by the vehicle seat or otherwise damaged.

These and other objects will become apparent with reference to the following description and appended drawing to wit:

FIGURE 1 is a view of vehicle seat with the holder device for carrying a seat belt retractable means.

FIGURE 2 is an enlarged sectional view of FIGURE 1;

FIGURE 3 is a view taken along line 3—3 of FIGURE 2;

FIGURE 4 is an enlarged view of the holder device; and

FIGURE 5 is a view taken along line 5—5 of FIGURE 4.

With reference now to the figures there is shown a vehicle chair or seat 2 having horizontal seat portion 2a and a back rest 2b provided with a safety seat belt 4 having a length 6 which is coupled with another seat belt length (not shown) around a user or passenger fastened by couple element 7 at the free end 8 of the belt lengths, the other end 10 of each belt length 6 having a floor anchor 12 for attachment of the belt lengths to the vehicle floor 13. A safety seat belt retractor mechanism 14 is located on each of the lengths and comprises a cylindrical or tubular member 16 which has a clamp structure 18 including a pair of prongs 20, 20 fastened to the cylinder member or barrel 16 and retaining the bight portion 22 of the belt length 6. A reaction member or hinge in the form of a U-shaped arm or bail 24 is rotatively journalled with respect to the tubular member 16 by having its first end portion 26 recessed within the driver hub 28 that extends into one end of the barrel 16 and forms a closure with the barrel. The second end portion 29 of member 24 is rotatively mounted in anchor plug 30 locked in the other end of the barrel 16. A helical coil spring 32 in the barrel 16 connects with hub 28 and plug 30.

From such an arrangement it will be seen that the reaction member 24 may be rotated relative to the tubular member 16 resulting in winding of the spring 32. When the spring 32 is placed in the wound state the belt length 6 is slipped within the clamp means 18 of the barrel 16 and the reaction member 24 allows the belt length 6 to be rolled about the tubular member 16 in a double-ply superimposed coil or layer. This construction permits the user or operator to pull on the end of the belt lengths against the action of the spring 32 to extend the belt to a length where the retractor device 14 merely hangs from the belt, and should the user be drawn forward in the vehicle when the belt is coupled about him, the retractor device 14, being out of the line of pull, will not interfere with the securing action of the safety seat belt.

This type of retractor mechanism for a safety seat belt is shown in co-pending patent application to Herbert A. McAninch and has Serial No. 274,271 filed April 9, 1963.

In the retractable type of safety seat belt arrangement, unrestrained, the belt length 6 will continue to roll up and locate itself in a position which is either inaccessible to the user or which may result in damage to the belt length 6 or its retracting mechanism 14, such as being caught between the back rest and horizontal seat portion of the car seat 2, and therefore there is provided a holder means or support in the form of a T-bar structure 40 having an elongated element or plate 42 provided with a plurality of apertures 43 extending from the lower end 44 of such plate 42 upwardly toward its central zone 45. The upper end 46 of the support bar 42 is provided with an aperture 47 which receives a screw, rivet or other fastening means 48 which may be integral with or received through the central or elongated portion 49 of the cross bar or transverse arm 50 which has curved end sections 51, 51 connecting with the central portion 49 and defining therewith a C-shaped belt receiving clasp or clip having a belt aperture 54 through which the belt length 6 extends in guided fashion. The end arm portions 51 are deflectable with respect to the straight end portion 49 and together therewith encompass the width 58 of the belt and guide it as the retractor mechanism 14 is allowed by the user to roll up the belt length 6 to an extent that the mechanism 14 with the belt length rolled therearound engages the upper part 59 of the clasp structure 50 that is pivotally journalled to the element or bracket 42 which is uprightly attached at its lower end zone 44 to the immovable side portion 2a of the seat 2 held by one or more rivets, bolts, screws or fastening means 64. The mode of connection, as depicted in FIGURE 2, provides that the T-bar assemby 40 should be so attached to the seat width that the upright bar 42 and its appended swivel or belt guide 50 allows the seat belt length 6 to have its longitudinally extending central portion lie along the crotch or intersection of the back rest 2b with the seat cushion 2a. The swivel so being pivotally connected to the bar 40 provides for easy location of the belt length 6 and retractor device 14 relative to the seat 2 and allowing latitude in location of the floor anchor points for the safety belt.

Preferably the retractor mechanism 14 is installed on the belt length 6 with the reaction member 24 engaging the outward facing surface of the belt length 6 (see FIGURE 2) and extending in the direction of the free end 8 of the belt length 6 so that the belt coil and roll up device 14 are adjacent the swivel 50 while the uncoiled portion belt length extends through the aperture 54 to the floor anchor 12 inhibiting further rolling up of the belt length 6 toward the floor anchor and in a position easily accessible to the user and out of the way from becoming soiled or damaged, such as being crushed by the back rest and the seat or by the car door or from becoming located behind the seat where the belt would be out of reach. It is appreciated that the retraction unit 14 may be reversibly mounted on the belt length whereby the reaction member 24 would point in the opposite direction and could be on the opposite side of the belt engaging with the clasp member 50 of the holder unit 40.

While only particular elements of the invention have been described and illustrated, it is apparent that modification and alterations may be made thereon. It is therefore the intention in the appended claims to cover all such modifications and alterations as may fall within the true spirit and scope of the invention.

What is claimed is:

1. A holder means for a retractable seat belt means comprising an elongated member having a vehicle attachment portion and a swivel attachment portion, said vehicle attachment portion being provided with an aperture adapted for registry with a vehicle fastener, said swivel attaching portion being provided with an aperture and lug means extending through said aperture, swivel safety seat belt support and guide means in the form of a second elongated member having a central portion provided with an aperture receiving said lug means in providing a pivotal connection of the swivel means with respect to the first elongated member, said swivel means being provided with a pair of end portions, each end portion extending from an end of the central portion and directed toward one another to define a belt entering aperture, said swivel means having a top end belt support surface and having the central and end portions defining a generally C-shaped clasp with a safety seat belt guide passage adapted to slidably receive the width of a seat belt length having an anchor portion and a free end portion wherein said free end portion of the seat belt length is retractable into a compact rolled up coil, the top end belt support surface of the swivel being adapted to receive the coil.

2. A seat belt structure comprising a flexible seat belt, a retractor mechanism receiving the seat belt in a double-ply superimposed coil and having a reaction means extending outwardly of the coil, a T-bar support comprising a lower elongated portion having a lower end provided with an aperture adapted for receiving vehicle fastening means and having an upper end, and a belt guide swivel pivotally connected with the upper end of the lower portion, said swivel having a central portion and a pair of end portions connected with the central portion and extending thereover to define a generally C-shaped belt slot, the end parts being spaced from one another to define a belt entry zone receiving the belt, and said swivel carrying the coil and retractor mechanism.

3. A T-bar holder for a retractable seat belt having a retractor mechanism receiving the seat belt length in a double-ply superimposed coil and having a reaction means extending outwardly of the coil, said T-bar holder comprising a lower elongated portion having a lower end provided with an aperture adapted for receiving vehicle fastening means and having an upper end, a belt guide swivel pivotally connected with the upper end of the lower portion, said swivel having a central portion and a pair of end portions connected with the central portion and extending thereover to define a generally C-shaped belt width slot, the end parts being spaced from one another to define a belt length entry zone.

4. A retractable safety seat belt structure comprising a T-bar support assembly for mounting on a vehicle, said T-bar assembly comprising an elongated section having upper and lower ends, the lower end of which is provided with a vehicle fastening aperture and the upper end of which is provided with a swivel aperture, fastening means receivable in the aperture at the upper end, a swivel seat belt guide means generally transversely disposed with respect to the elongated section, said swivel means having an intermediate portion having an aperture receiving said fastening means for pivotal movement of the swivel means with respect to the elongated section, said intermediate portion being provided with a pair of opposed end sections turned over on the intermediate portion to define a generally C-shaped belt width slot, each end section having a free end portion that together defines a belt entry opening, a seat belt length extending through the slot, a belt retractor device having a reaction portion and mounted on the belt length and placing the length in a double-ply coil engageable with the upper end portion of the swivel, said seat belt length having an anchor portion below the retractor device for attachment to the vehicle and a free end portion extending above the retractor device and receiving the reaction portion of the retraction device.

5. A holder and support structure in combination with a vehicle retractable safety seat belt and comprising a swivel T-bar support unit mountable on the outside of a vehicle seat, said unit including an upright arm having a lower end and having an upper end, a transverse swivel in the form of a generally C-shaped member having a central portion pivotally connected with the upper end of the arm, and a pair of end portions each connected with the central portion and extending thereover, said end portions each having a free end defining with one another a belt entrance, the central and end portions defining a belt guide channel and an upper seat, a combination seat belt and seat belt retractor means, said seat belt having a free end portion upwardly of the upper seat of the member and a vehicle anchor portion below the swivel for connection with the vehicle floor and a bight portion, said retractor mechanism provided with clamp means coupled on the belt bight portion between the free end and anchor portions and above the seat and operable to wind the belt into a double-ply coil engageable with the seat and having a reaction element extending away from the seat in the direction of the free end of the belt, said lower end of the arm having means for being fixedly connected to the outside of the seat and said swivel being pivotally oriented with respect to the arm in receiving the portion of the belt below the coil and above the anchor portion of the belt.

6. A holder and support structure in combination with a retractable seat belt and comprising a support unit mountable on a vehicle and including an upright arm having a lower end and having an upper end, a transverse swivel having a central portion pivotally connected with the upper end of the arm and a pair of end portions connected with the central portion and extending thereover and defining with the central portion a belt guide channel and an upper seat, a combination seat belt and seat belt retractor means including a seat belt having a free end vehicle anchor portion and an intermediate bight portion, a retractor mechanism coupled on the bight portion and operable to wind the belt into a double-ply coil engageable with the upper seat, said lower end of the arm having vehicle connecting means and said swivel being pivotally oriented with respect to the arm in receiving the portion of the belt below the coil and above the anchor portion of the belt.

7. A holder and support structure for a vehicle retractable safety seat belt having a vehicle anchor portion and a portion rolled into a coil by a belt retractor, said structure comprising a swivel T-bar support unit adapted for mounting on the outside of a vehicle seat, said unit including an upright arm having a lower end and having an upper end, a transverse swivel in the form of a generally C-shaped member having a central portion pivotally connected with the upper end of the arm and a pair of end portions each connected with the central portion and extending thereover and each end portion having a free end defining with one another a belt entrance, the central and end portions defining a belt width guide channel and an upper seat for receiving the coil, said lower end of the arm having means adapted for connecting to the outer portion of the vehicle seat and said swivel being pivotally oriented with respect to the arm in receiving the belt below the coil and above the anchor portion thereof.

8. A holder for a retractable seat belt having a retractor mechanism receiving the seat belt length in a double-ply superimposed coil and having a reaction means extending outwardly of the coil, said holder comprising a lower elongated portion having a lower end provided with an aperture adapted for receiving vehicle fastening means and having an upper end, a belt guide swivel pivotally connected with the upper end of the lower portion, said swivel having a central portion and a pair of end portions connected with the central portion and extending thereover to define a belt width slot, the end parts being spaced from one another to define a belt length entry zone.

9. A retractable safety seat belt structure comprising a support assembly for mounting on a vehicle, said assembly comprising an elongated section having upper and lower ends, the lower end of which is provided with a vehicle fastening aperture and the upper end of which is provided with a swivel aperture fastening means receivable in the aperture at the upper end, a swivel seat belt guide means generally transversely disposed with respect to the elongated section, said swivel means having an intermediate portion having an aperture receiving said fastening means for pivotal movement of the swivel means with respect to the elongated section, said intermediate portion being provided with a pair of opposed end sections turned over on the intermediate portion to define a belt width slot, each end section having a free end portion that together defines a belt entry opening, a seat belt length extending through the slot, a belt retractor device having a reaction portion and mounted on the belt length and placing the length in a double-ply coil engageable with the upper end portion of the swivel, said seat belt length having an anchor portion below the retractor device for attachment to the vehicle and a free end portion extending above the retractor device and receiving the reaction portion of the retraction device.

10. A holder and support structure for a vehicle retractable safety seat belt having a vehicle anchor portion and a portion rolled into a coil by a belt retractor, said structure comprising a swivel support unit adapted for mounting on the outside of a vehicle seat, said unit including an upright arm having a lower end and having an upper end, a transverse swivel in the form of a member having a central portion pivotally connected with the upper end of the arm and a pair of end portions each connected with the central portion and extending thereover and each end portion having a free end defining with one another a belt entrance the central and end portions defining a belt width guide channel and an upper seat for receiving the coil, said lower end of the arm having means adapted for connecting to the outer portion of the vehicle seat and said swivel being pivotally oriented with respect to the arm in receiving the belt below the coil and above the anchor portion thereof.

References Cited by the Examiner

UNITED STATES PATENTS

| | | | |
|---|---|---|---|
| 425,792 | 4/1890 | Hitt | 24—182 X |
| 2,394,523 | 2/1946 | Pancoe | 297—389 |
| 2,495,029 | 1/1950 | Spengler | 24—182 X |
| 2,688,294 | 9/1954 | McCloud | 242—157 |
| 2,747,815 | 5/1956 | Trapido | 242—157 |
| 2,861,627 | 11/1958 | Smith | 297—388 |
| 2,898,976 | 8/1959 | Barecki | 297—386 X |
| 2,953,189 | 9/1960 | Barash | 297—216 |
| 2,964,100 | 12/1960 | McCall | 297—388 |
| 3,020,089 | 2/1962 | Monroe | 297—388 |

FOREIGN PATENTS 261,235   11/1928   Italy.

FRANK B. SHERRY, *Primary Examiner.*